Sept. 12, 1967 L. CERF 3,340,996
CONVEYOR MACHINE FOR PACKAGING FRUIT AND THE
LIKE ARTICLES IN CASINGS OF PLASTIC MATERIAL
Filed June 26, 1964 2 Sheets-Sheet 1

INVENTOR.
LUCIEN CERF
BY
OSTROLENK, FABER, GERB & SOFFEN
ATTORNEYS

United States Patent Office 3,340,996
Patented Sept. 12, 1967

3,340,996
CONVEYOR MACHINE FOR PACKAGING FRUIT AND THE LIKE ARTICLES IN CASINGS OF PLASTIC MATERIAL
Lucien Cerf, Ablon, France, assignor to Alain Cerf, Montabon, Sarthe, France
Filed June 26, 1964, Ser. No. 378,390
Claims priority, application France, June 29, 1963, 939,880
6 Claims. (Cl. 198—189)

The present invention relates to an improved machine for packaging various articles of a substantially uniform size, chiefly foodstuffs such as fruit, and more particularly to a machine for forming an envelope comprised of two sheets of plastic material, generally transparent, between which are placed the articles to be packaged by suitably sealing together the sheets of material around each group of articles and shrinking the sheets of material after the sealing.

In the known machines of this type, fruit or the like articles are first laid on plates or frames made of cardboard or the like material. These plates are provided with recesses for receiving the articles and holding them. Once the plates have been laden with fruit, they are placed on a conveyor strip so as to pass in succession through a means adapted to cover the entire laden plate with a sheet of plastic material. The sheet is then sealed, or welded, closed over the plate carrying the fruit so as to form a casing or envelope. Generally, the welds are made so as to form an area of reduced resistance in the succession of adjacent envelopes so that it is an easy matter to subsequently separate the groups of fruit from one another.

Machines of this type have the drawbacks of requiring the preliminary manufacture of recessed frames and the feeding into, and positioning of the frames in the machine. This causes an increase in the cost of the packaging.

The present invention has for its object the provision of a packaging machine of the above-described type which does not have the above-noted drawbacks.

To this end, the improved packaging machine of the instant invention includes an endless conveyor of a generally elongated shape, including an upper horizontal operative side and a lower horizontal side which returns in an empty condition, said conveyor being provided with carrier means adapted to receive, carry and hold transiently the articles to be packaged in the positions in which they have been laid or grouped together. The machine includes means for driving said conveyor, preferably stepwise in an operative direction, and means for unwinding and for sealing sheets of plastic material around the peripheries of the groups of articles.

The present invention allows laying of the fruit or the like articles on the carrier means of the conveyor so that it is possible to eliminate the use of the conventional recessed plates.

The present invention contemplates embodiments incorporating at least one of the following features:

The endless conveyor is comprised of a succession of carrier means of a generally rectangular shape which carrier means include means for receiving and holding in position the articles to be packaged. These receiving and positioning means are supported means by the two opposing side members of the carrier means which are secured to the corresponding links of the two endless synchronously driven chains.

The means receiving and holding in position the articles to be packaged comprise at least one pair of rods perpendicular to the operative direction of the conveyor. The spacing between the rods is preferably adjustable and is made smaller than the minimum transverse dimension of the articles to be carried transiently between them.

Across each pair of rods are fitted two cross-members adapted to be slidable longitudinally along the rods. The cross-members have associated means, preferably elastic means which hold the cross-members at any desired positions along said rods with a view to ensuring the lateral holding in position of the articles to be packaged.

The ends of one of the rods of each pair of rods, are secured permanently to the opposed shorter sides of the corresponding carrier means, while the ends of the other rod of each pair are fitted into openings in the shorter sides. The openings are elongated in the direction of progression of the conveyor and the rods are provided with means locking them in any desired adjusted position along the openings.

As an alternate adjustment means, the ends of the first-mentioned rods of each pair are each housed in one of the openings or notches of a series of notches formed along the edge of each shorter side of each carrier means and they are held fast therein by suitable retaining means.

The means for retaining the ends of each rod in a notch comprise a spring of which one end is secured to the rod and the other end is secured to the nearest opposing shorter side of the carrier means.

Furthermore, the machine includes means for unwinding two sheets, chiefly sheets of plastic material adapted to shrink when heated. The sheets are unwound over and underneath the articles to be packaged.

At least one sealing system is provided for sealing the upper sheet to the lower sheet along lines perpendicular to the direction of progression of the conveyor, ahead and behind each group of packaged articles. According to a preferred embodiment of the invention, the sealing is done by a welding process which is performed by means of a wire heated by electric pulses in a manner well known in the art.

The invention will be readily understood upon reading of the following description, reference being made to the accompanying drawings which illustrate by way of example and in a non-limiting sense two embodiments of a machine for packaging fruit according to my invention.

For simplicity, the expression "fruit" will be used for designating any articles to be packaged since the machine may serve for packaging various articles of a substantially uniform size.

Figure 1:
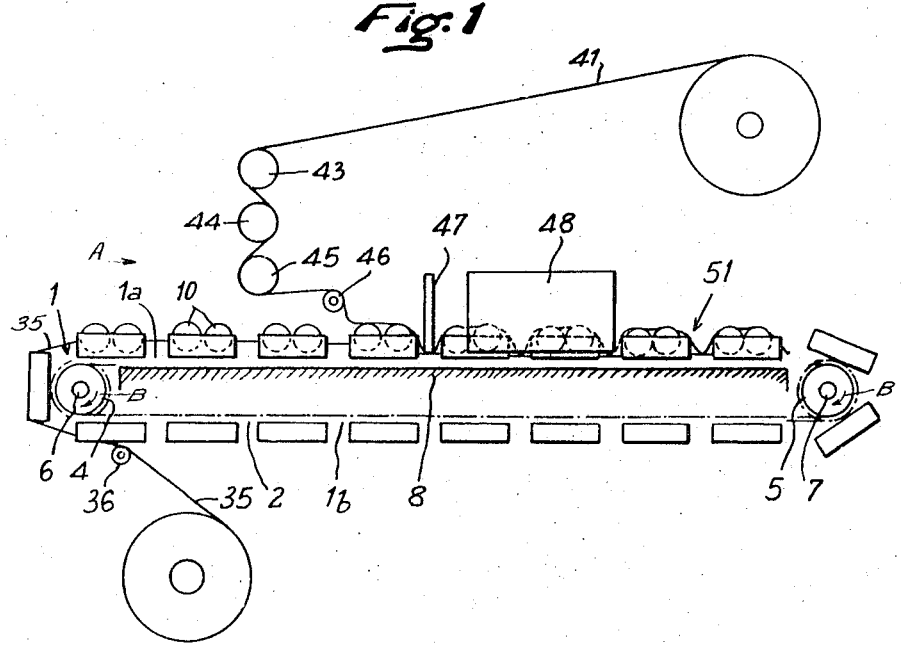
FIG. 1 is a diagrammatic side view showing the chief components of the machine of the instant invention.
Figure 2:
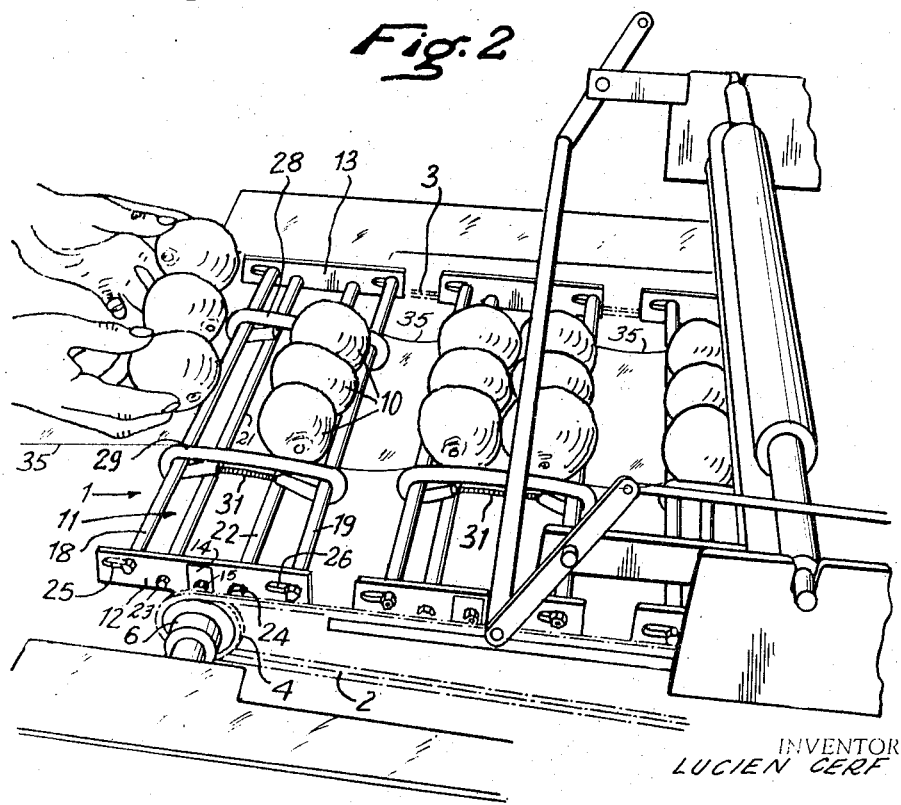
FIG. 2 is a perspective view of the input end of the machine of the instant invention as seen from above.

The machine illustrated diagrammatically in FIG. 1 includes an endless conveyor 1 of a generally elongated shape including an upper horizontal operative side 1a and a lower horizontal idle return side 1b. The conveyor is carried by two endless chains 2 and (see also FIG. 2) each of which engages two toothed wheels, such as wheels 4 and 5. The wheels are fitted on corresponding horizontal parallel shafts, such as shafts 6 and 7, one of which is driven intermittently in an unvarying direction B through any suitable means which are not illustrated. At least the upper side of each chain rests on a guiding plate 8. The fruit to be packaged in groups, as illustrated in FIG. 2, is placed upon a carrier means 11 (see FIGS. 2–4) of a generally rectangular shape of which the two shorter longitudinal side members 12 and 13 comprise a flange secured, e.g. through the agency of screws 15 to a plate 14 rigid with a link 16 of the corresponding endless chain.

The longer transverse sides of each carrier means are comprised of two rods 18 and 19, having, for instance, a circular cross-section. The rods may be enclosed in a sheath of plastic material.

The transverse rods 18 and 19 position and transiently hold the fruit in cooperation, respectively, with rods 21 and 22. The rods 21 and 22 are positioned between and parallel to rods 18 and 19, and may be lower than the rods 18 and 19.

In the examples illustrated, the two inner transverse rods 21 and 22 are fixedly secured to the side members 12 and 13. To this end, their threaded ends extend through corresponding openings in the side members and carry locking nuts 23 and 24. The two outer rods 18 and 19 are adjustably secured by having their ends extend into corresponding elongated openings 25 and 26 formed in the side members 12 and 13. The apertures 25 and 26 are elongated in the direction of operation of conveyor 1. The ends of rods 18 and 19 are provided with terminal heads or threadedly engaging nuts.

A first group of three pieces of fruit is thus enabled to rest in the cradle formed by outer rod 18 and inner rod 21 and a second group of three pieces of fruit is enabled to rest in the cradle formed by the inner rod 22 and the outer rod 19. The spacing between each outer rod and its cooperating inner rod is adjusted in accordance with the transverse dimension of the fruit to be packaged.

In order to position the fruit laterally, that is lengthwise of the rods carrying them, adjustable cross-members are provided as shown at 28 and 29, each cross-member comprising, for instance, a loop of plastic tube around the two outer rods 18 and 19. The two ends of the tube are urged towards each other by means of a tensioned spring 31. It is thus possible to move the cross-members 28 and 29 toward and away from each other, as required by the size of the fruit or the number of pieces of fruit in a group.

All the carrier means 11 are identical.

The machine includes a first roll comprised of a strip 35 (FIG. 1) of a suitable plastic material adapted to be shrunk which is fed along the lower side 1b of the conveyor in the vicinity of the input end of the machine over a guiding roller 36 so as to cover successive carrier means 11 as they pass thereby on their way to the input end of the machine.

A similar upper sheet of plastic material shown at 41 winds off a second roll and passes over guiding members such as 43, 44, 45, 46 so as to be laid over groups of fruit which are carried by the carrier means 11 in the manner disclosed. An electrode 47 extending across the conveyor 1 is employed to weld the two sheets 35 and 41 together between the successive carrier means 11, two lateral electrodes extending parallel to and along the conveyor 1, such as that shown at 48, are employed to weld the two sheets along the sides of the groups of fruit parallel with the direction of motion of the conveyor.

Figure 3:
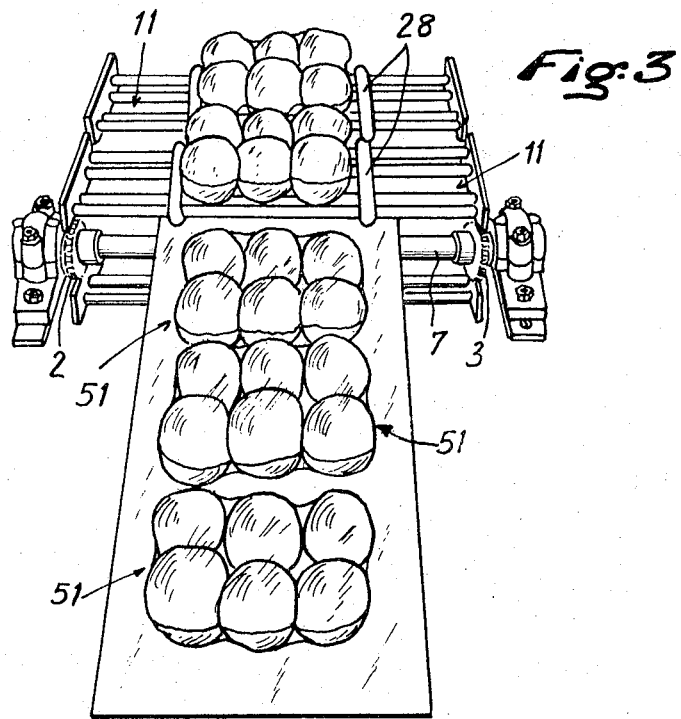
FIG. 3 is a perspective view of the output end of the machine of the instant invention also as seen from above.

The machine operates as follows. During the inoperative period between the intermittent forward movements of the conveyor, the operator places a group of, for example, six pieces of fruit in the carrier means 11 then located at the input end of the machine (FIG. 2). The conveyor then progresses stepwise in the operative direction A and carries along with it the lower sheet 35 of plastic material which covers the means 11 and on which sheet the fruit are laid while the upper sheet 41 of plastic material is laid over the fruit. After each intermittent progression, for a distance approximating the length of one carrier means the electrode 47 welds the two sheets together between the successive groups of fruit, while the lateral electrodes 48 weld together the longitudinal edges of the two sheets registering with the outer ends of the groups. The groups of packaged fruit then move outwardly as shown at 51 (FIGS. 1 and 3). Each group is now held within a casing of plastic material formed by the two sheets thus welded together, and the carrier means 11 no longer are needed to support the fruit.

Figure 4:
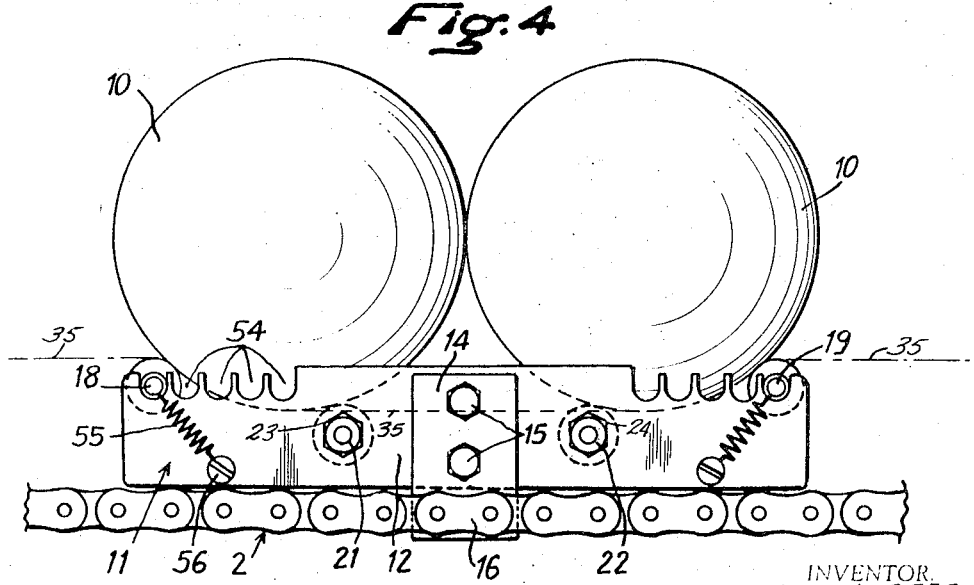
FIG. 4 is a side view of a modification of the conveying means of the instant invention of which only a part is illustrated.

FIG. 4 illustrates a modification in the means for adjusting the position of the outer rods 18 and 19 of the fruit-carrying frame means 11. Each end of the rods 18 and 19 engages one of a series of openings, such as notches 54 formed in the upper edge of the side members 12 and 13 of the means 11. Each end of each rod is held in position by means of a tensioned coil spring 55 of which one end engages the end of the rod while the other end is secured e.g. to screw 56 in the vicinity of the lower edge of said side member. According to which pair of notches in the two corresponding opposed side members of the carrier means in which each rod is positioned, the spacing between the outer and inner rods of each carrier means is increased or reduced as required by the size of the fruit to be packaged. Such an adjustment does not require the use of any tool.

My invention is by no means limited to the embodiments described and illustrated herein and various modifications may be made thereto within the scope of the invention. Accordingly, my rights are limited only by the accompanying claims.

What I claim is:
1. In a conveyor
said conveyor being movable in an operative direction; means operatively connected to said conveyor for driving said conveyor in said operative direction; said conveyor having a plurality of carrier means distributed along itself; said carrier means being comprised of at least one pair of parallel rods extending across said conveyor transversely of said operative direction of said conveyor; support means for supporting said rods the improvement comprising:
means for adjusting the spacing between said rods of said pair of rods, parallel to said operative direction, whereby said carrier means is enabled to hold different articles of varying dimensions.
2. In a conveyor
said conveyor being movable in an operative direction; means operatively connected to said conveyor for driving said conveyor in said operative direction; said conveyor having a plurality of carrier means distributed along itself; said carrier means being comprised of at least one pair of parallel rods extending across said conveyor transversely of said operative direction of said conveyor; support means for supporting said rods the improvement comprising:
a first and a second cross member extending across said pair of rods, said cross members being spaced apart,
said pair of rods and said cross members defining, a position for the placement of a group of articles to be packaged.
3. In the conveyor of claim 2, the improvement further comprising:
said first and said second cross member being movable along said pair of rods to adjust the size of the position for the placement of a group of articles.
4. In the conveyor of claim 3, the improvement further comprising:
an elastic means holding said first and said second cross member on said pair of rods.
5. In the conveyor claim 1, said means for supporting said rods comprising side members extending parallel to said operative direction of said conveyor;

said means for adjusting the spacing between said rods of said pair of rods comprising openings in said side members.

6. In the conveyor of claim 5, one rod of said pair of rods being rigidly secured to said side members;

said side members having upper edges; said spacing adjusting means for adjusting the spacing between said rods of said pair of rods comprising a plurality of notches in each of said upper edges of said side members, the other rod of said pair of rods being selectively positionable in any one of said notches in each of said side members.

References Cited

UNITED STATES PATENTS

| | | | |
|---|---|---|---|
| 2,486,759 | 11/1949 | Pfeiffer | 53—180 X |
| 2,525,651 | 10/1950 | Clunan | 53—180 X |
| 3,022,618 | 2/1962 | Schwartz et al. | 53—180 X |
| 3,174,617 | 3/1965 | Noffsinger | 198—195 |

GRANVILLE Y. CUSTER, JR., *Primary Examiner.*